United States Patent [19]
Shouji et al.

[11] Patent Number: 5,734,536
[45] Date of Patent: Mar. 31, 1998

[54] THIN FILM MAGNETIC HEAD WITH POLE HAVING VARIABLE THICKNESS

[75] Inventors: Shigeru Shouji; Atsushi Toyoda, both of Hamamatsu, Japan

[73] Assignee: Yamaha Corporation, Japan

[21] Appl. No.: 726,392

[22] Filed: Oct. 4, 1996

[30] Foreign Application Priority Data

Oct. 9, 1995 [JP] Japan ................. 7-288072

[51] Int. Cl.$^6$ ................. G11B 5/23; G11B 5/147
[52] U.S. Cl. ................. 360/126; 360/119
[58] Field of Search ................. 360/126, 119

[56] References Cited

U.S. PATENT DOCUMENTS 5,331,497 7/1994 Fuchigami ................. 360/126
5,479,310 12/1995 Atsushi et al. ................. 360/126

Primary Examiner—A. J. Heinz
Attorney, Agent, or Firm—Ostrolenk, Faber, Gerb & Soffen, LLP

[57] ABSTRACT

A lower pole gradually increases its thickness in a section from the pole front end surface toward the depth direction. An upper pole gradually increases its thickness in a section from the pole front end surface toward the depth direction. The lower pole has a constriction at an area deeper than the gradually increasing section.

4 Claims, 14 Drawing Sheets

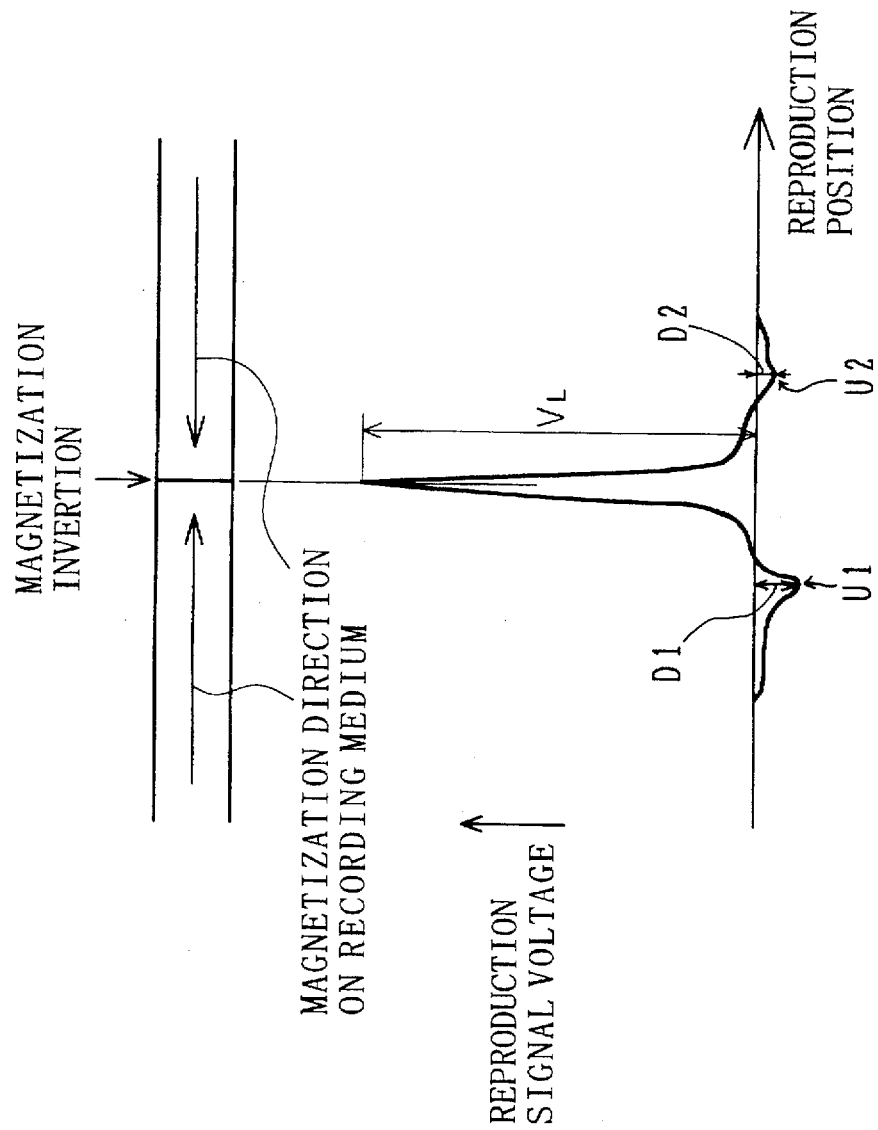

THIN FILM MAGNETIC HEAD WITH POLE HAVING VARIABLE THICKNESS

BACKGROUND OF THE INVENTION a) Field of the invention

The present invention relates to an induction type thin film magnetic head with the improved reproduction characteristics capable of reducing dips undershoot of a reproduction signal.

b) Description of the Related Art

A reproduction type thin film magnetic head is used as a recording/reproducing element of a magnetic disc drive and as a recording element of a composite magnetic head combined with a magnetoresistive (MR) head to Form a composite magnetic head. A conventional magnetic head used by a magnetic disc drive is shown in FIGS. 2A to 2C. FIG. 2A is a front view of the magnetic head, FIG. 2B is a cross sectional view taken along line A—A in FIG. 2A, and FIG. 2C is a partially enlarged view of FIG. 2B. In this example, a coil is made of three coil layers 20, 24, and 28. Reference numerals 91a and 91b represent terminals.

The thin film magnetic head 1 is formed on a slider substrate 10 having a polished clean mirror surface. The slider substrate 10 is made of, for example, a ceramic plate of $Al_2O_3$-TiC. A protection layer 12 made of inorganic insulating material such as $SiO_2$ and $Al_2O_3$ is deposited on the substrate 10 to a thickness of ten and several um by sputtering. A lower magnetic film 14 is laminated upon the protection layer 12 by electroplating. A magnetic gap layer 16 is laminated (deposited) upon the lower magnetic layer 14 by sputtering, the magnetic gap layer 16 forming a magnetic gap 17 at the pole portion of the magnetic head. The magnetic gap layer 16 is made of such as $SiO_2$ and $Al_2O_3$ like the protection layer 12.

A first insulating layer 18 is laminated upon the magnetic gap layer 16. This insulating layer 18 is usually made of positive photoresist thermally cured and stabilized. On the first insulating layer 18, a first coil layer 20 made of Cu or other metals is deposited by electroplating to a thickness of several μm. On the First coil layer 20, a second insulating layer 22, a second coil layer 24, a third insulating layer 26, a third coil layer 28, and a Fourth insulating layer 30 are sequentially laminated in this order by similar methods as above.

On the fourth insulating layer 30, an upper magnetic layer 32 is formed by electroplating. A throat height TH is defined by the portion where the upper and lower magnetic layers 32 and 14 face in parallel, with the magnetic gap 17 being interposed therebetween. The end portion 92 of the upper magnetic layer 32 opposite to the side of poles 36 and 38 is in tight contact with the lower magnetic layer 14. A passivation layer 34 such as $SiO_2$ and $Al_2O_3$ is Formed on the whole surface of the upper magnetic layer 32 by sputtering.

As shown in the enlarged view of FIG. 2C, the upper and lower magnetic layers 14 and 32 of the thin film magnetic head 1 have a lower pole (leading pole) 36 and an upper pole (trailing pole) 38 which have the same thickness portions extending from pole front end surfaces 36a and 38a into the inside of the head. The thin film magnetic head 1 moves relative to a magnetic recording medium, and the leading pole 36 tracks the medium first and the trailing pole 38 follows thereafter.

A reproduction output waveform of a magnetic head having the pole structure shown in FIGS. 2A to 2C is illustrated in FIG. 3. The abscissa of the waveform represents a reproduction position, and the ordinate represents a reproduction signal voltage. A solitary wave having a peak voltage $V_L$ appears at the reproduction position where the magnetizing direction of a recording medium is inverted. In addition to this output of a voltage $V_L$, dips (undershoots) U1 and U2 are generated. The dip U1 is generated because the thickness P1 of the leading (lower) pole 36 is finite, and the dip U2 is generated because the thickness P2 of the trailing (upper) pole 38 is finite. The larger the depths (dip depths) D1 and D2 of these undershoots U1 and U2, the more errors are likely to be generated in a PRML (partial response maximum likelihood) signal process. As shown in FIGS. 4a and 4B, in the PRML signal process, a signal whose dips are cut is generally used. As the signal shown in FIG. 4A is cut along the broken line, a signal shown in FIG. 4B is obtained with the undershoots U1 and U2 being removed. In order to cut the undershoots, a signal is also required to be cut. Therefore, the larger the dips, the more the signal is required to be cut. This leads to a small signal intensity so that an SN margin becomes small and errors are likely to be generated.

In the induction type thin film magnetic head having the pole structure shown in FIGS. 2A to 2C, areas AR near the pole front end surfaces 36a and 38a are likely to be magnetically saturated. This magnetic saturation at the areas AR near the pole front end surfaces 36a and 38a broadens a writhe magnetic field BW in the track transport direction and a linear record density cannot be increased.

SUMMARY OF THE INVENTION

An object of the present invention is to provide an induction type thin film magnetic head capable of reducing undershoots of a reproduction signal and improving the reproduction characteristics and track density.

According to one aspect of the present invention, there is provided an induction type thin film magnetic head comprising: an upper magnetic film for forming an upper pole with the front end facing a magnetic recording medium; a lower magnetic film for forming a lower pole with the front end facing the magnetic recording medium, a front end portion of the lower pole gradually increasing a pole thickness in a depth direction; and a magnetic gap layer formed between the upper and lower poles for forming a magnetic gap between the upper and lower poles.

The end (edge in the track transport direction) of the under pole is not definite in terms of magnetization as viewed from the recording medium. Accordingly, the dip depth of the undershoot in a reproduction signal reduces and the read error can be suppressed. The above structure is particularly efficient when it is applied to the lower pole having a large undershoot.

BRIEF DESCRIPTION OF THE DRAWINGS

FIG. 3 shows a waveform with undershoots of a reproduction signal output from the conventional induction type thin film magnetic head shown in FIGS. 2A to 2C.

DETAILED DESCRIPTION OF THE PREFERRED EMBODIMENTS

Figure 1A:
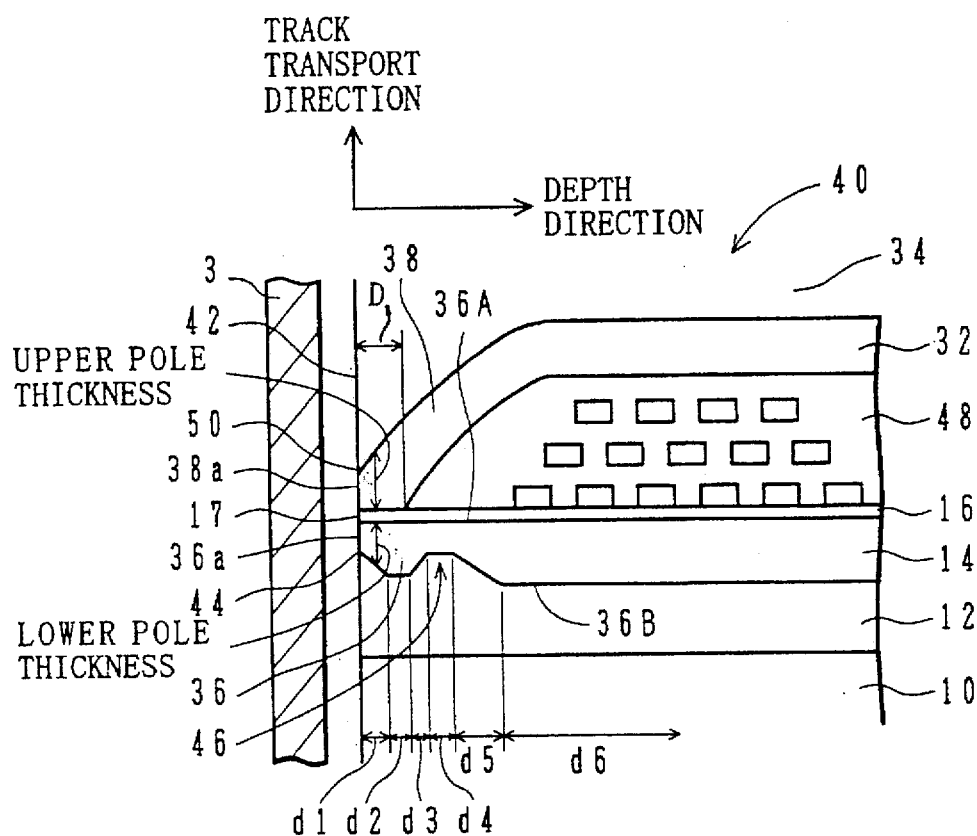
FIG. 1A is a cross sectional view of a thin film magnetic head according to an embodiment of the invention.
Figure 1B:
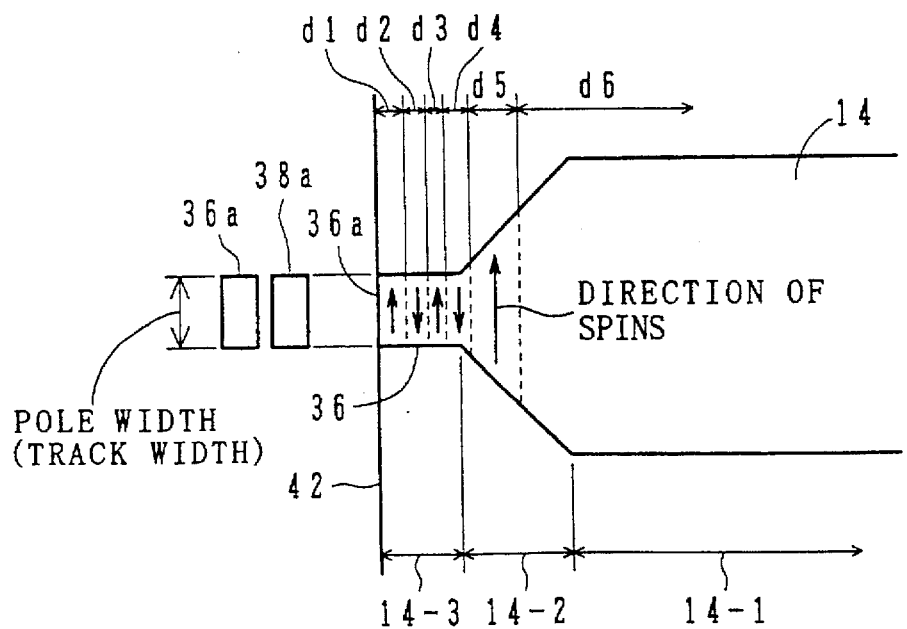
FIG. 1B is a plan view of a lower magnetic layer.
Figure 6:
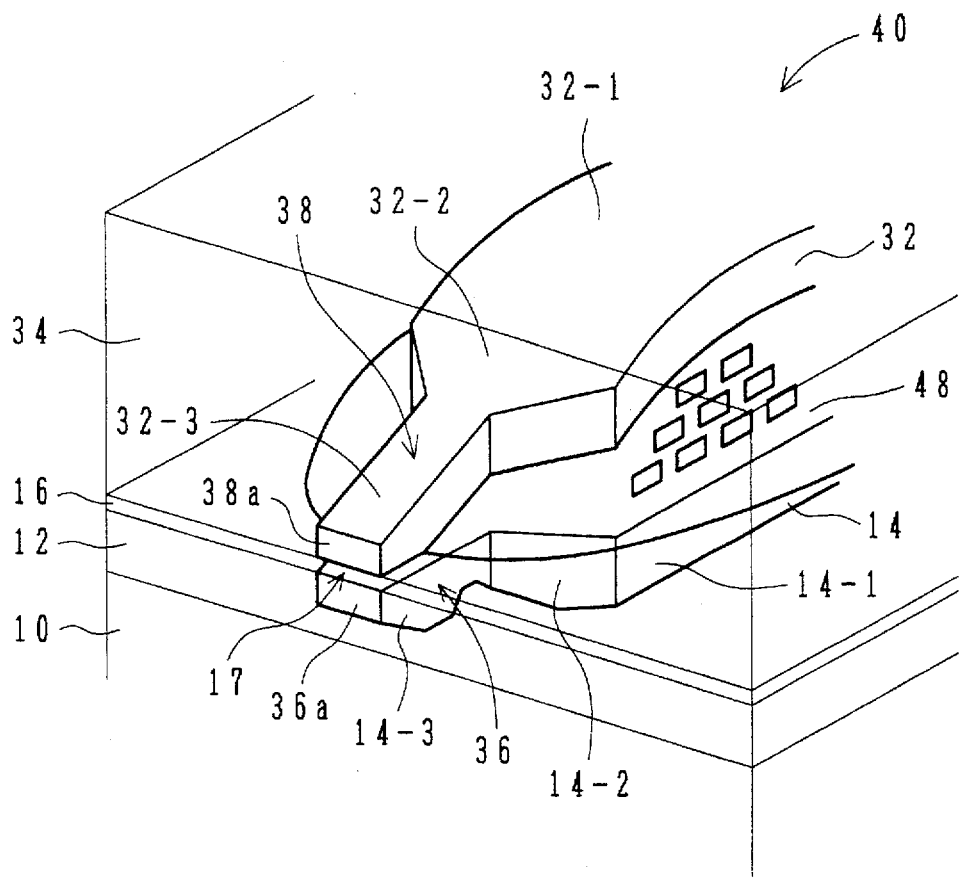
FIG. 6 is a perspective view of the induction type thin film magnetic head shown in FIGS. 1A and 1B.

A thin film magnetic head according to an embodiment of the invention is shown in FIGS. 1A and 1B. FIG. 1A is a cross sectional view of the thin film magnetic head, and FIG. 1B is a plan view of a lower magnetic layer 14 showing magnetic domains formed thereon. FIG. 6 is a perspective view of the thin film magnetic head. In this induction type thin film magnetic head 40, only the configurations of the areas near poles 38 and 36 of upper and lower magnetic layers 32 and 14 are different from the induction type thin Film magnetic head 1 shown in FIGS. 2A to 2C. The thin film magnetic head 40 can record and read data on and from a magnetic recording medium 3 facing pole Front end surfaces 86a and 88a.

The thin film magnetic head 40 is formed on a slider substrate 10 having a polished clean flat surface. The slider substrate 10 is made of, for example, a ceramic plate of $Al_2O_3$-TiC.

A protection layer 12 made of inorganic insulating material such as $SiO_2$ and $Al_2O_3$ is deposited on the substrate 10 to a thickness of ten and several μm by sputtering. A lower magnetic layer 14 is laminated upon the protection layer 12 by electroplating. The lower magnetic layer 14 is made of, for example, Permalloy (NiFe alloy). A magnetic gap layer 16 of a predetermined thickness is laminated upon the flat upper surface of the lower magnetic layer 14 by sputtering, the magnetic gap layer 16 forming a magnetic gap 17 at the pole portion of the magnetic head. The magnetic gap layer 16 is made of non-magnetic material such as $SiO_2$ and $Al_2O_3$(alumina) similar to the protection layer 12.

A coil and insulating layer 48 is laminated upon the magnetic gap layer 16, and the upper magnetic layer 32 is formed over the coil and insulating layer 48. The upper magnetic layer 32 is made of, for example, Permalloy electroplated with Cu or the like. The upper magnetic layer 32 is covered with a protective layer 34 of $SiO_2$, $Al_2O_3$ or the like laminated by sputtering.

The lower magnetic layer 14 has a broad portion 14-1, a width changing portion 14-2, and a narrow portion 14-3. The broad portion 14-1 extends from the lower pole front end surface 36a into the inside of the head in the direction perpendicular to the front end surface 36a, and has a constant width in the direction perpendicular to the track transport direction and in parallel with the air bearing surface (ABS) 42. The width changing portion 14-2 gradually reduces its width toward the lower pole front end surface 36a. The narrow portion 14-3 has a predetermined length from the lower pole front end surface 36a to the inside of the head in the direction perpendicular to the lower pole front end surface 36a, and has generally a constant width nearly equal to the track width. The width of the narrow portion 14-3 is preferably in an error range of ±10% of the track width.

The upper surface 36A of the lower pole 36 is a flat surface perpendicular to ABS 42 and track transport direction. The lower surface 36B of the lower pole 36 is made irregular. The thickness (in the direction in parallel to ABS 42 and along the track transport direction) of the lower pole 36 changes in the range from the lower pole front end surface 36a toward the inside of the head in the direction perpendicular to ABS 42. Specifically, a section d1 having a slanted surface of a predetermined depth from the lower pole front end surface 36a gradually increases its thickness, a section d2 contiguous with the section d1 has a constant thickness, a section d3 contiguous with the section d2 gradually reduces its thickness (the sections d1 to d3 corresponding to the narrow portion 14-3), a section d4 contiguous with the section d3 (the section d4 riding upon the width changing portion 14-2) has a constant thickness, a section d5 contiguous with the section d4 (the section d5 being in the width changing portion 14-2) gradually increases its thickness, and a section d6 contiguous with the section d5 (the section d6 being in the width changing portion 14-2 and broad portion 14-1) has a constant thickness thicker than the section d2. The length of the section d1 along the perpendicular direction to the ABS 42 is about 1–3 μm, for example. The thickness of the lower pole 36 is uniform in width direction at each position in the depth direction. Therefore, the cross section of the lower pole 36 cut in the plane parallel to ABS 42 at each position in the depth direction is always rectangular, and the width and/or depth of the cross section changes. The boundary lines (shape changing positions) between the sections d1 to d6 are straight lines parallel to ABS 42 as indicated by broken lines in FIG. 1B.

The upper magnetic layer 32 is formed on the upper slant surface of the coil and insulating layer 48. A section D from ABS 42 to the start position off the insulating layer 48 (a throat height zero position) forms an area where the thickness of the upper pole 38 gradually and substantially increases in the depth direction. For example, D is about 0.8–2.5 μm. The upper magnetic layer 32 does not have a flat pole portion along the perpendicular direction to the ABS 42. The upper magnetic layer 32 is formed so as to define a predetermined angle to the normal to the ABS 42, for example 30°–60°. The plan projection shape of the upper magnetic layer 32 is generally the same as the lower magnetic layer 14, and as shown in FIG. 6, has a broad portion 32-1, a width changing portion 32-2, and a narrow portion 32-3. The upper pole front end surface 38a is flush with the lower pole front end surface 36a in the track width direction and both the pole front end surfaces have the same shape (rectangle) and size.

The thickness of the lower pole 36 of the induction type thin film magnetic head 40 with the above pole structure gradually increases in the depth direction in the section d1. Therefore, the end (leading edge 44) of the lower pole is not definite in terms of magnetization as viewed from the recording medium. Accordingly, the dip depth D1 (refer to FIG. 3) of the undershoot U1 to be caused by the leading edge 44 reduces and the undershoot amount (corresponding to the area of the undershoot shown in FIG. 3) reduces.

The thickness of the upper pole 38 gradually increases in the depth direction in the section D. Accordingly, the dip depth D2 (refer to FIG. 3) of the undershoot U2 to be caused by the trailing edge 50 reduces and the undershoot amount reduces. This may be ascribed to indefiniteness of the end (trailing edge 50) of the upper pole in terms of magnetization as viewed from the recording medium.

Figure 2A:
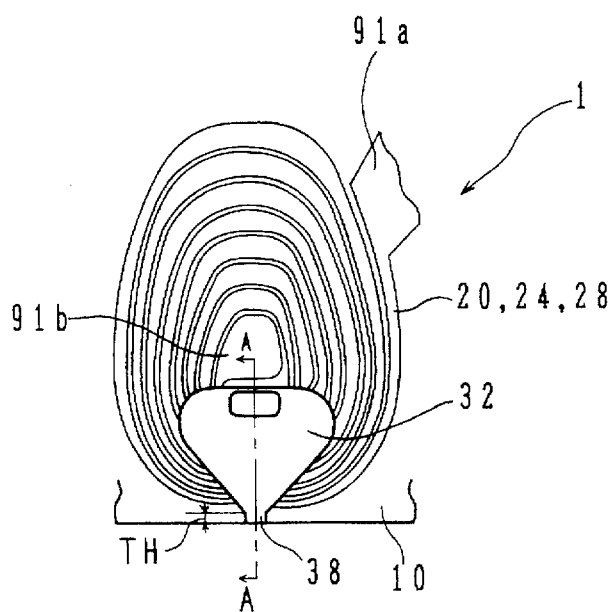
FIG. 2A is a plan view of a conventional thin film magnetic head.
Figure 2B:
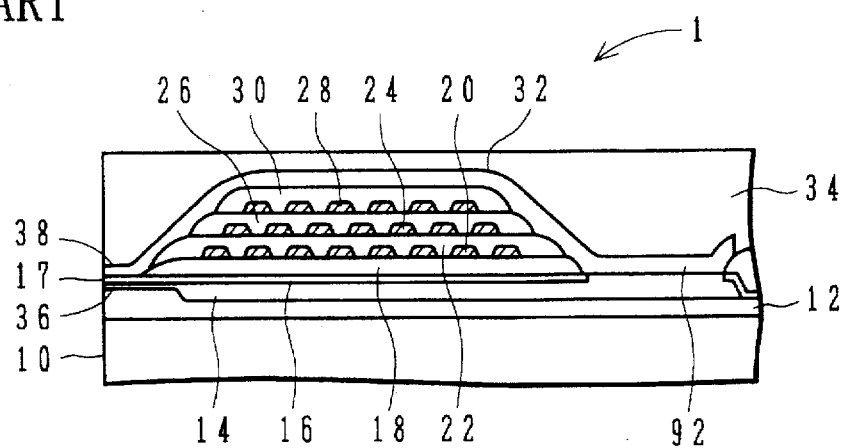
FIG. 2B is a cross sectional view taken along line A—A of FIG. 2A.
Figure 2C:
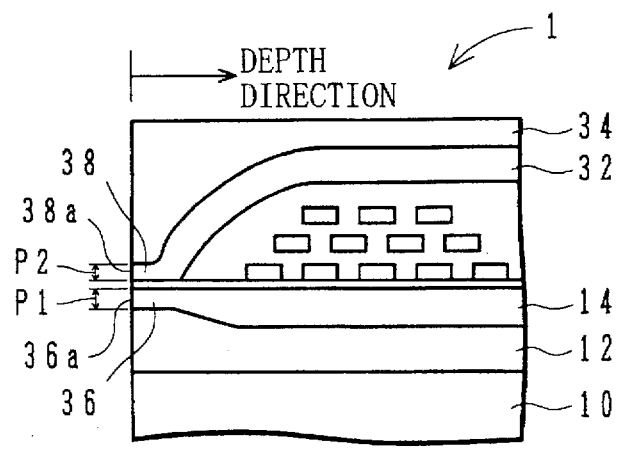
FIG. 2C is a partial enlarged cross sectional view taken along line A—A of FIG. 2A.
Figure 4A:
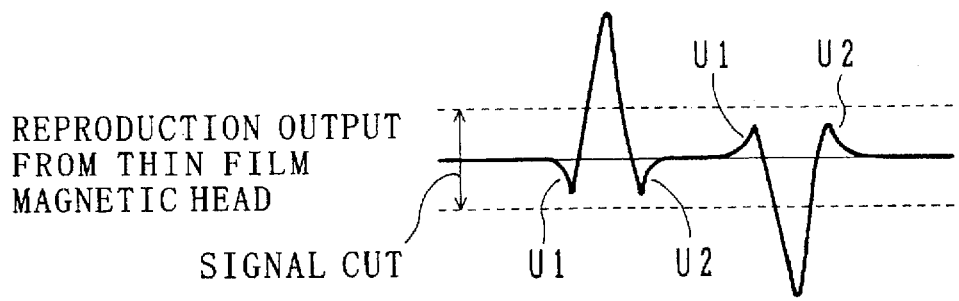
FIGS. 4A and 4B show waveforms illustrating how undershoots are removed from the reproduction signal shown in FIG. 3.
Figure 4B:
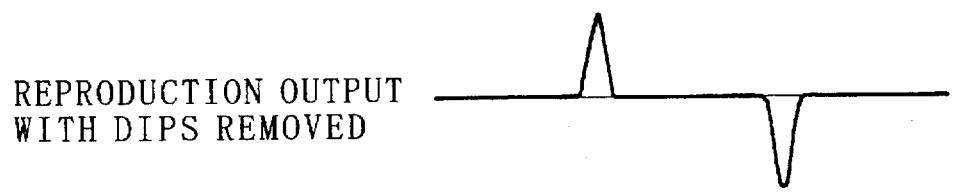
Figure 5:
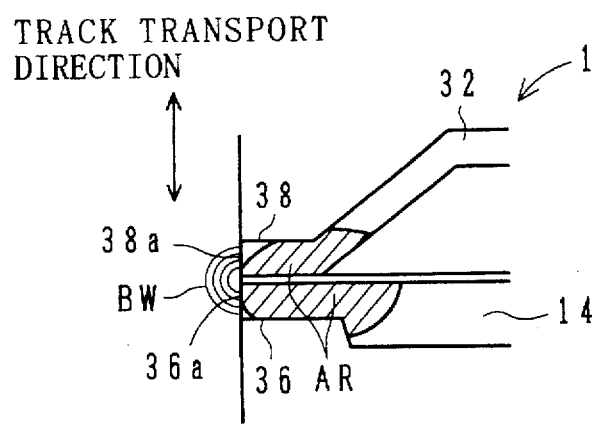
FIG. 5 shows magnetically saturated areas of the induction type thin film magnetic head shown in FIGS. 2A to 2C.

According to the experiments, although the conventional induction type thin film magnetic head 1 shown in FIGS. 2A to 2C had the undershoot amount of 8 to 12% in a reproduction signal, the induction type thin film magnetic head 40 shown in FIGS. 1A and 1B reduced the undershoot amount to 4 to 7% nearly a half of the conventional magnetic head. Reduction of the undershoot of the lower pole 36 side (leading edge side) with large dip depth and undershoot is particularly efficient. With the induction type thin film magnetic head 40 shown in FIGS. 1A and 1B, the reproduction characteristics are improved and a signal waveform suitable for PRML, signal processing can be obtained because of reduced undershoots.

Figure 7:
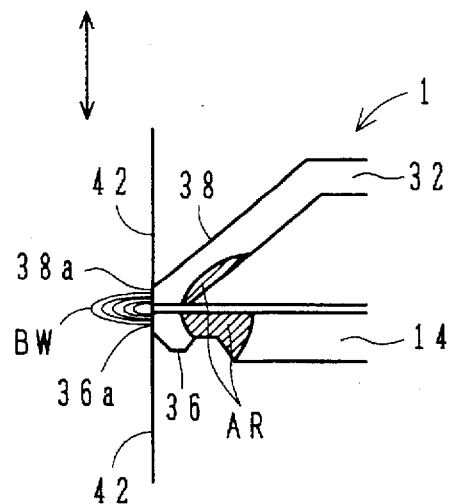
FIG. 7 shows magnetically saturated areas of the induction type thin film magnetic head shown in FIGS. 1A and 1B.

The lower pole 36 has a constriction 46 formed in the sections d3 to d5. Magnetic fluxes are constricted at this sections during data write and magnetic saturation occurs at an area AR near this constriction 46. Magnetic fluxes reaching the pole front end surface 36a are therefore limited. As shown in FIG. 7, magnetic saturation becomes hard to occur at the area near the pole front end surfaces 36a and 38a. Therefore, the write magnetic field BW does not broaden in the track transport direction and becomes steep or sharp. Reversed magnetized areas per unit motion distance can therefore be formed more on the recording medium to thereby improve the record density.

Still further, as shown in FIG. 1B, the boundary lines between the sections d1 to d6 (shape changing positions) are straight lines parallel to ABS 42. Therefore, the directions of spins in each magnetic domain become easily in parallel to ABS 42 because of magnetic anisotropy and magnetic fluxes move at high speed spin rotation. High permeability is therefore possible up to a high frequency band and the reproduction sensitivity can be improved in the high frequency band. The improved reproduction sensitivity permits using a thin film magnetic head with a narrow track width and the track density can be increased.

Next, the manufacture method of the induction type thin Film magnetic head 40 shown in FIGS. 1A and 1B will be described. For the general background of this manufacture method, for example, refer to U.S. Pat. No. 5,479,310 and U.S. Ser. No. 08/556,574 filed on Nov. 13, 1995 which are herein incorporated by reference. With this manufacture method to be described, a number of thin film magnetic heads 40 are formed on a single wafer. The details of this manufacture method will be given with reference to FIGS. 8A to 13B. In these drawings, only one thin film magnetic head is shown.

FIGS. 8A to 8F are cross sectional side views of a thin film magnetic head.

(1) Resist Coating

Figure 8A:
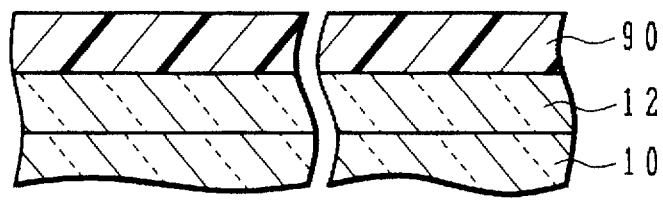
FIG. 8A to 8F are cross sectional views of a thin film magnetic head illustrating the processes of a method of manufacturing a thin film magnetic head according to an embodiment of the invention.

Referring to FIG. 8A, a smooth protection layer 12 such as aluminum is formed on a substrate 10 made of, for example, $Al_2O_3$- TiC. A resist film 90 is coated on the whole surface of the protection layer 12. The resist film 90 is used for forming a recess in the protection layer 12 at the deeper area than the constriction 46 of the lower magnetic layer 14.

(2) Pattern Cutting

Figure 8B:
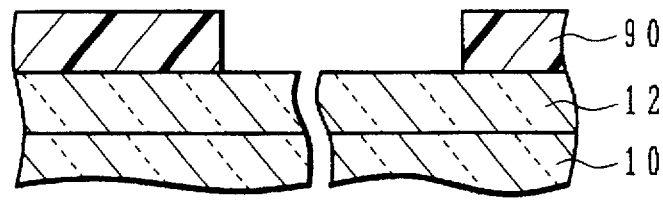

Referring to FIG. 8B, the resist film 90 is vertically cut by photolithography at the area where the recess is formed in the protection layer 12.

(3) Heating and Melting

Figure 8C:
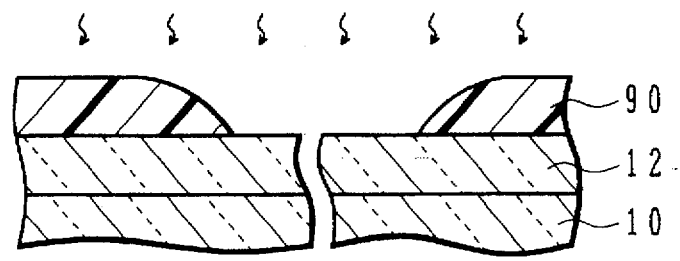

Referring to FIG. 8C, the resist film 90 is heated and reflowed. The vertical side wall of the resist 90 fellows and a smooth slant side wall is formed.

(4) Ion Milling

Figure 8D:
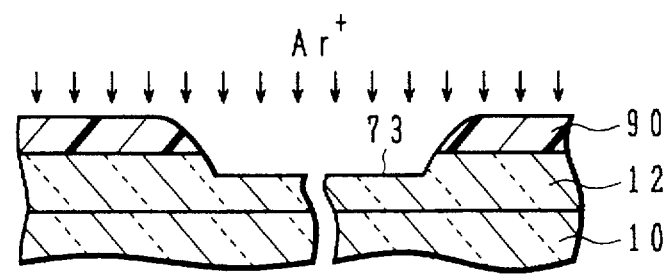

Referring to FIG. 8D, argon ions or the like are applied over the whole surface of the wafer by using an ion milling apparatus (e.g., Hitachi, Ltd. IML-250) under the conditions of an acceleration voltage of 600 V, a deceleration voltage of −300 V, and an Ar pressure of $2 \times 10^{-4}$ Torr. With this milling, the surface of the protection layer 12 is cut and a recess 73 is formed in the protection layer 12. Since the resist 90 had the smooth slant side wall, the recess 78 has also a smooth slant side wall.

(5) End of Ion Milling

Figure 8E:
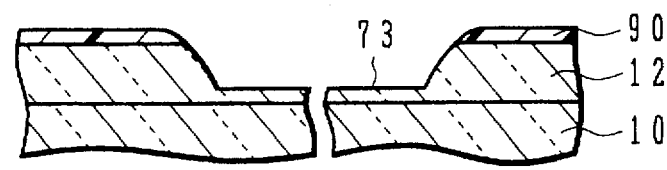

Referring to FIG. 8E, when the recess 73 having a predetermined depth is formed, ion milling is terminated.

(6) Removal of Resist

Figure 8F:
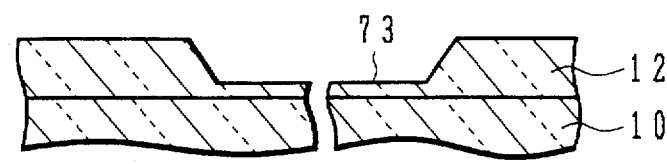

Referring to FIG. 8F, the resist film 90 is removed to prepare the wafer having the recess 73 in the protection layer 12 at the area deeper than the constriction 46 of the lower magnetic layer 14.

Figure 9A:
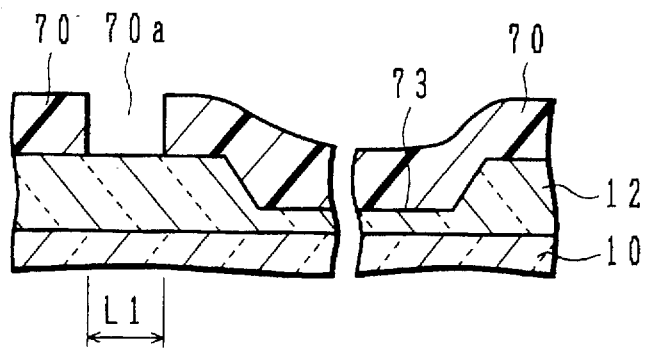
FIGS. 9A to 9C are cross sectional views illustrating the processes to be followed by the process illustrated in FIG. 8F.
Figure 9B:
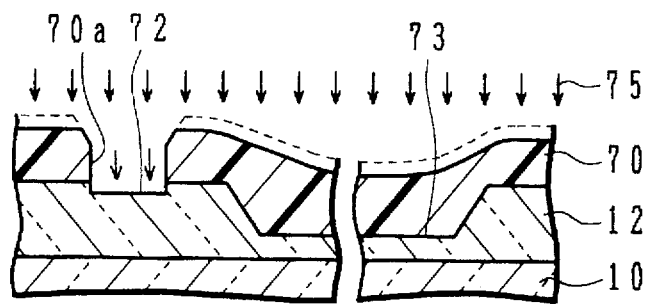
Figure 9C:
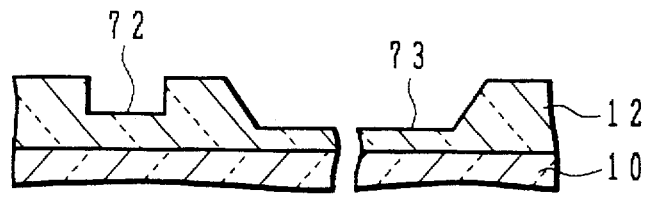

FIGS. 9A to 9C are cross sectional side views of the thin film magnetic head.

(7) Resist Coating and Cutting

Referring to FIG. 9A, a resist film 70 is coated to a thickness of about 8 μm over the whole surface of the wafer. The resist film 70 is used for forming an opening at an area shallower than the constriction 46 of the lower magnetic head 14 on the ABS 42 side. The resist Film 70 is vertically cut by photolithography at the area where the opening is formed. The plan shape of the cut area is rectangular, the cut area having a predetermined length L1 in the depth direction and a predetermined width in the direction perpendicular to the depth direction (in the direction perpendicular to the drawing sheet).

(8) Vertical Milling by Ion Etching

Referring to FIG. 9B, ion beams (or other particle beams) 75 are vertically applied to the whole surface of the wafer to vertically mill the protection layer 12 exposed in the opening 70a of the resist film 70 and to form a recess 72 in the protection layer 12 (milling process by dry etching such as Ar ion etching). The depth of the recess 72 is determined from the maximum thickness P10 (refer to FIG. 13A) of the lower pole 36 at the area shallower than the constriction 46 on the ABS 42 side.

If the thickness of the resist film 70 coated prior to applying the ion beams is set to about 8 μm, the depth of the recess 72 can be set to about 1.5 µm. The thickness of the resist film 70 is determined from the milling rate ratio of the protection layer (e.g., alumina) 12 to the resist film 70. Milling is enhanced at the upper corner of the opening 70a of the resist film 70, similar to the milling process for the whole surface of the protection layer 12 to be described later. It is necessary to determine the thickness of the resist film 70 so that the milling process is terminated before the lowest portion of the obliquely milled corner (beveled corner) reaches the protection layer 12.

(9) Removal of Resist

Referring to Fla. 9C, after the milling process, the resist film 70 is removed.

(10) Milling Whole Surface of Protection Layer

Figure 10A:
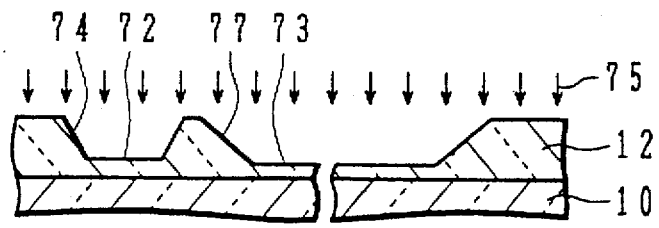
FIGS. 10A to 10E are cross sectional views illustrating the processes to be followed by the process illustrated in FIG. 9C.

FIG. 10A is a cross sectional side view of the thin film magnetic head. Ion beams (or other particle beams) 75 are vertically applied to the whole surface of the wafer to perform a milling process. For example, Ar ion beams are used For this milling process. Since the milling is enhanced at the upper corner of the recess 72, the side wall 74 of the recess 72 is milled obliquely (faceted or beveled) at a constant angle and a slanted surface is Formed. The side wall 77 of the recess 73 is also milled obliquely. When the side wall 74 of the recess 72 is milled obliquely to the bottom of the wall, the milling process is terminated. This process has a controllability far better than that when a milling process such as ion etching is performed by using a mask such as an obliquely formed resist film shown in FIGS. 8A to 8F. Therefore, the precision of the dimensions of the slanted surface 74 and other areas can be controlled to be 0.3 µm or smaller.

Figure 14:
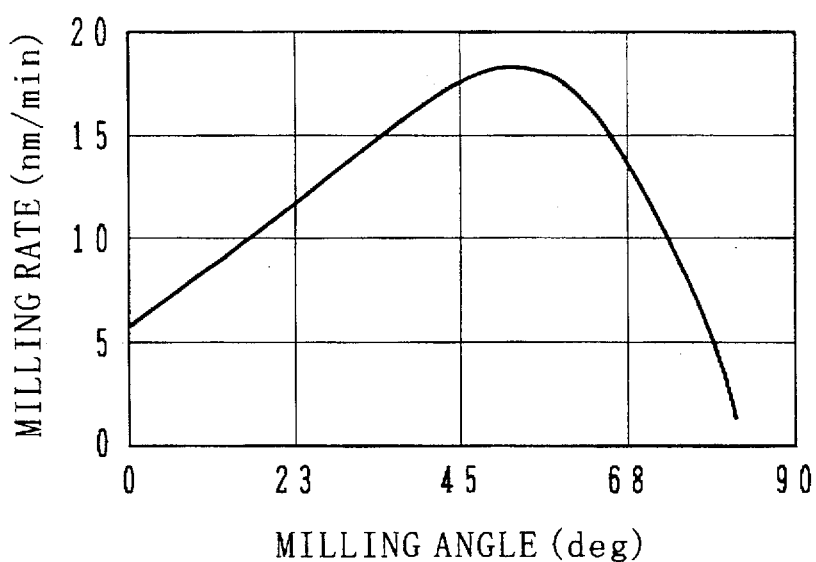
FIG. 14 is a graph showing the relationship between a motion direction of milling particles and a milling rate.

The mechanism why the side wall 74 is obliquely milled to the bottom of the wall at a constant angle will be discussed. There is a relationship between the motion direction of milling particles and the milling rate, as seen from the graph shown in FIG. 14. The larger the milling angle, the faster the milling rate. If alumina is used, a maximum milling rate is obtained in the slanted angle range of 40° to 60°. Therefore, if the surface of an aluminum layer having a right angle step is milled, the milling progresses at the maximum milling rate at the upper corner of the step.

Figure 15A:
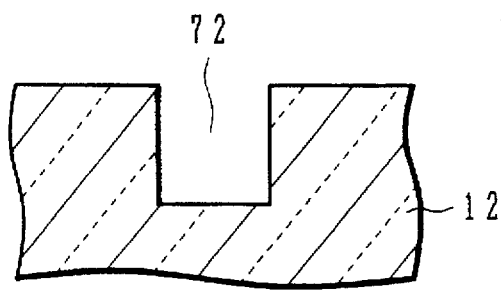
FIGS. 15A to 15D are cross sectional views illustrating how the inner wall Of a recess is formed into a slanted surface at a constant angle in the processes illustrated in FIG. 10A.
Figure 15B:
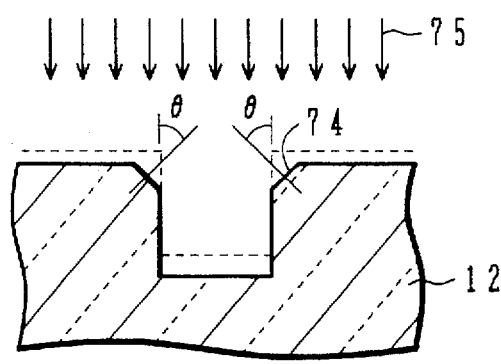
Figure 15C:
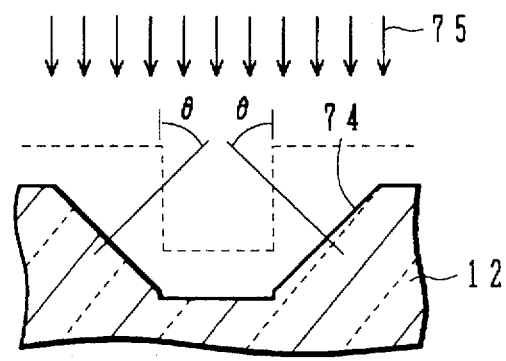
Figure 15D:
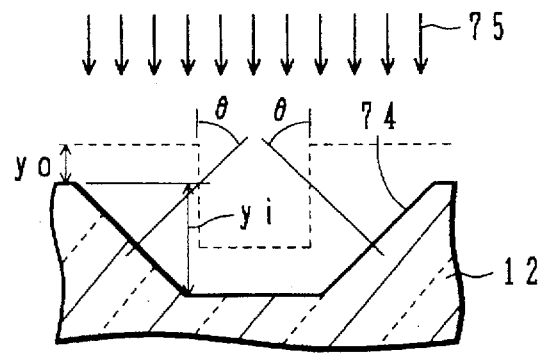

The processes of vertically applying ion beams to the whole surface of the protection layer 12 (e.g., alumina) and obliquely milling the side wall of the recess 72 at a constant angle, will be described with reference to the cross sectional views of the protection layer 12 shown n FIGS.15A to 15D.

i) Referring to FIG. 15A, the protection layer 12 is vertically cut by photolithography and etching to form the recess 72 in the protection layer 12.

ii) Referring to FIG. 15B, milling particles 75 are vertically applied to the whole surface of the protection layer 12. The upper corner or edge 74 of the recess 72 has angle components of 0° to 90°, so that the edge 74 is milled at the maximum milling rate.

iii) Referring to FIG. 15C, if alumina is used, the milling rate is fastest at an angle θ of 40° to 60° so that the edge 74 is milled at this angle.

iv) Referring to FIG. 15D, when the edge 74 is milled to the bottom of the side wall, the vertical surface of the side wall disappears. Thereafter, as the milling further progresses, the upper corner of the slanted surface as well as the bottom (lower side) of an inverted trapezoid widens while maintaining the constant angle of the slanted surface. yO represents a thickness of the milled upper surface of the protection layer 12, and yi represents a height (depth from the upper side to the lower side) of the inverted trapezoid after the milling. A ratio of yO to yi is determined by a ratio of a milling rate at the angle 0° to the maximum milling rate.

(11) Formation of Underlying Layer for Plating

Figure 10B:
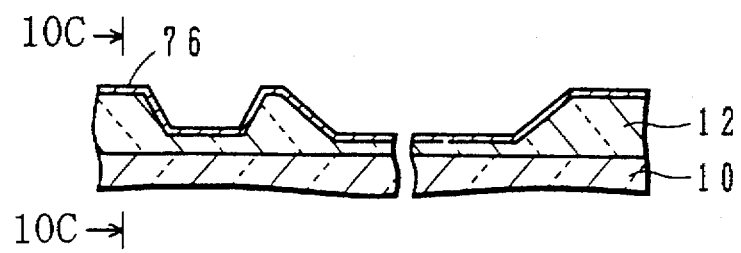
Figure 10C:
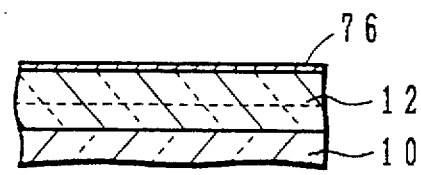

FIG. 10B is a cross sectional side view of the thin film magnetic head, and FIG. 10C is a cross sectional front view as viewed from line A—A of FIG. 10B. An underlying layer 76 for plating is formed on the whole surface of the wafer by sputtering or evaporation. The underlying layer 76 is made of, for example, Permalloy.

(12) Cutting Resist Film

Figure 10D:
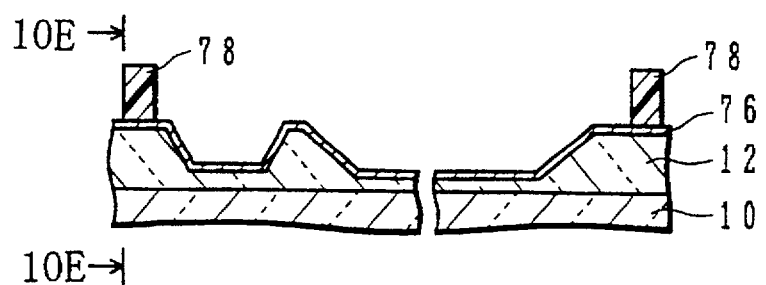
Figure 10E:
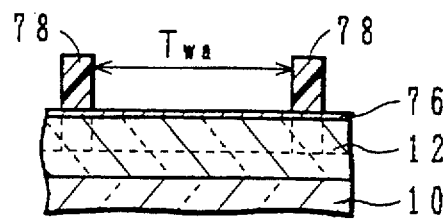

FIG. 10D is a cross sectional side view of the thin film magnetic head, and FIG. 10E is a cross sectional Front view as viewed from line A—A of FIG. 10D. A resist film is formed on the underlying layer 76 and cut by photolithography to form a resist pattern 78. This resist pattern 78 is used For Forming the lower magnetic layer 14 inclusive of the lower pole 36 by plating. The resist pattern 78 has a width defined by inner walls same as the lateral width Twa of the lower pole 36.

(13) Plating Lower Magnetic Layer

Figure 11A:
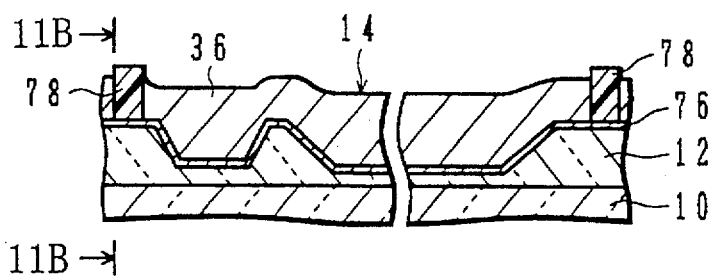
FIGS. 11A to 11F are cross sectional views illustrating the processes to be followed by the processes illustrated in FIGS. 10D and 10E.
Figure 11B:
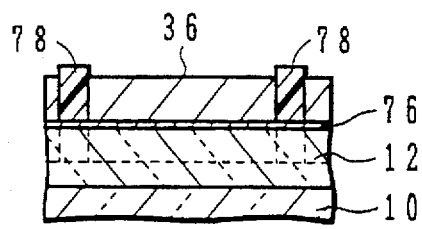

FIG. 11A is a cross sectional side view of the thin film magnetic head, and FIG. 11B is a cross sectional front view as viewed from line A—A of FIG. 11A. The lower magnetic layer 14 inclusive of the lower pole 36 is formed on the exposed underlying layer 76 with magnetic material to a thickness of 5 to 6 µm, for example by plating Permalloy.

(14) Removal of Resist Pattern

Figure 11C:
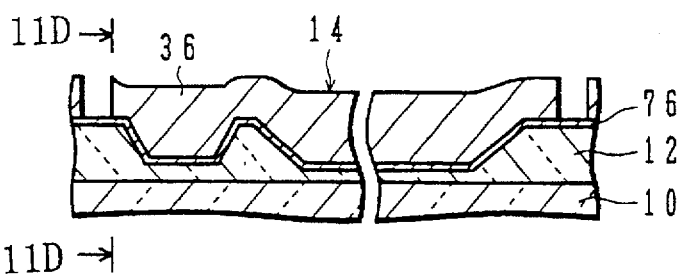
Figure 11D:
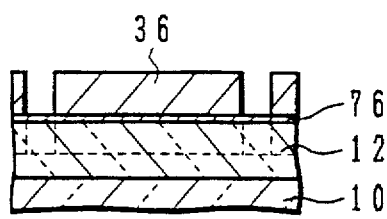

FIG. 11C is a cross sectional side view of the thin film magnetic head, and FIG. 11D is a cross sectional front view as viewed from line A—A of FIG. 11C. The resist pattern 78 is removed. The underlying layer 76 is exposed through holes formed by removing the resist pattern 78.

(15) Milling Underlying Layer

Figure 11E:
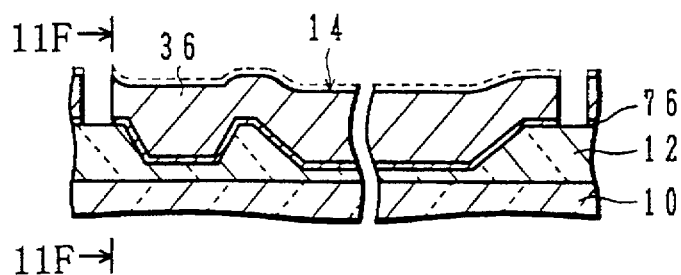
Figure 11F:
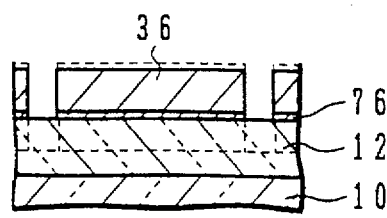

FIG. 11E is a cross sectional side view of the thin film magnetic head, and FIG. 11F is a cross sectional front view as viewed From line A—A of FIG. 11E. The underlying layer 76 exposed after the removal of the resist pattern 78 is removed by ion etching.

(16) Removal of Unnecessary Plated Film

Figure 12A:
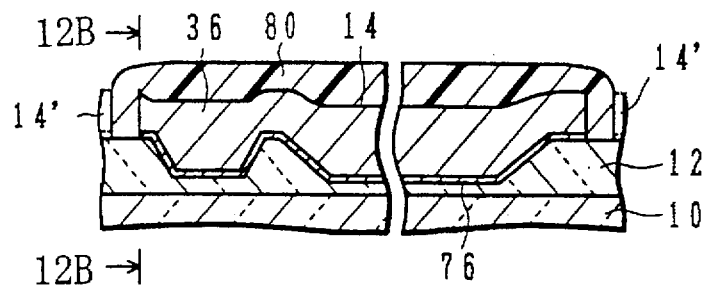
FIGS. 12A to 12F are cross sectional views illustrating the processes to be followed by the processes illustrated in FIGS. 11E and 11F.
Figure 12B:
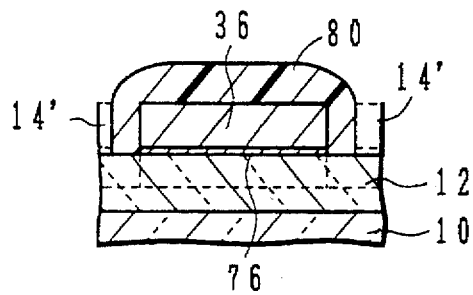

FIG. 12A is a cross sectional side view of the thin film magnetic head, and FIG. 12B is a cross sectional front view as viewed from line A—A of FIG. 12A. A protective resist film 80 is coated over the lower magnetic layer 14 inclusive of the lower pole 36, and an unnecessary plated film not covered with the resist film 80 is removed by wet etching or other processes. Thereafter, the resist Film 80 is removed.

(17) Forming Inorganic Insulating Film

Figure 12C:
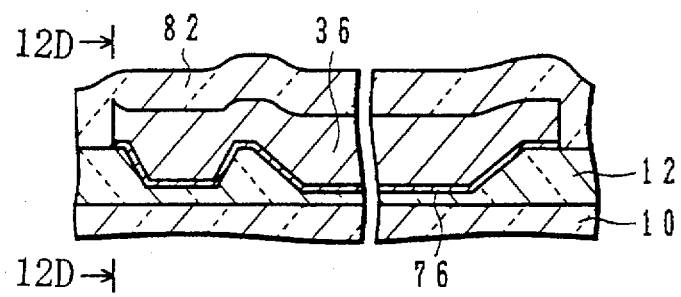
Figure 12D:
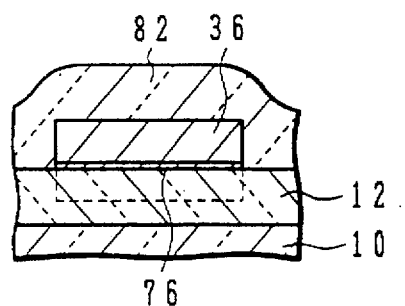

FIG. 12C is a cross sectional side view of the thin film magnetic head, and FIG. 12D is a cross sectional front view as viewed from line A—A of FIG. 12C. An inorganic insulating film 82 such as alumina is formed over the whole surface of the wafer to a thickness of 8 to 12 µm.

(18) Final Lapping

Figure 12E:
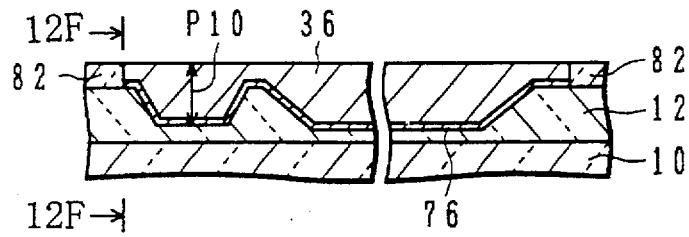
Figure 12F:
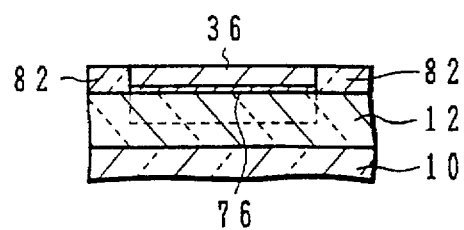

FIG. 12E is a cross sectional side view of the thin film magnetic head, and FIG. 12F is a cross sectional front view as viewed from line A—A of FIG. 12E. The whole surface of the wafer is lapped to expose and planarize the lower magnetic layer 14 inclusive of the lower pole 36 and to obtain the predetermined thicknesses P10 defining the maximum thickness portion of the lower pole 36. With the above processes, the lower pole 36 shape can be formed precisely.

(19) Other processes

Figure 13A:
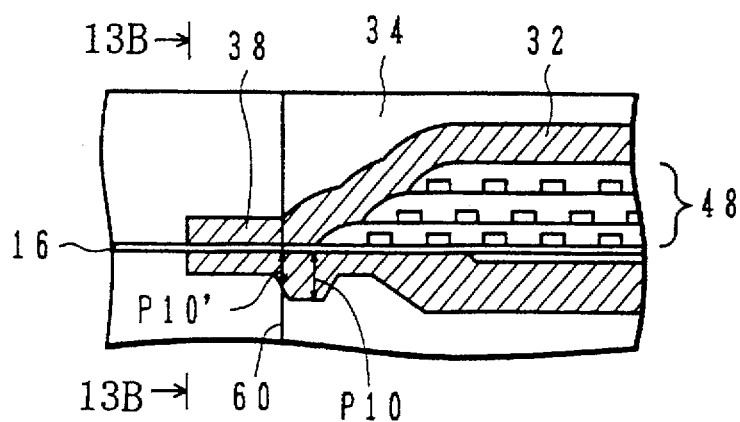
FIGS. 13A and 13B are cross sectional views illustrating the processes to be followed by the processes illustrated in FIGS. 12E and 12F.
Figure 13B:
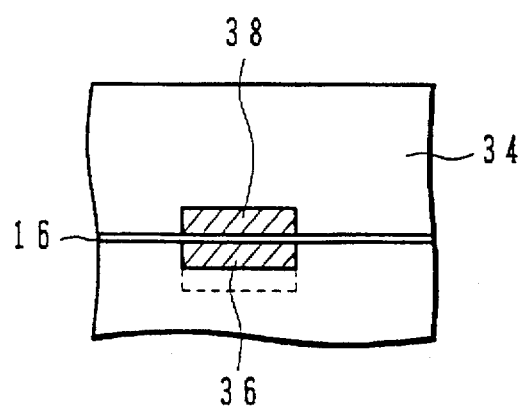
Figure 16:
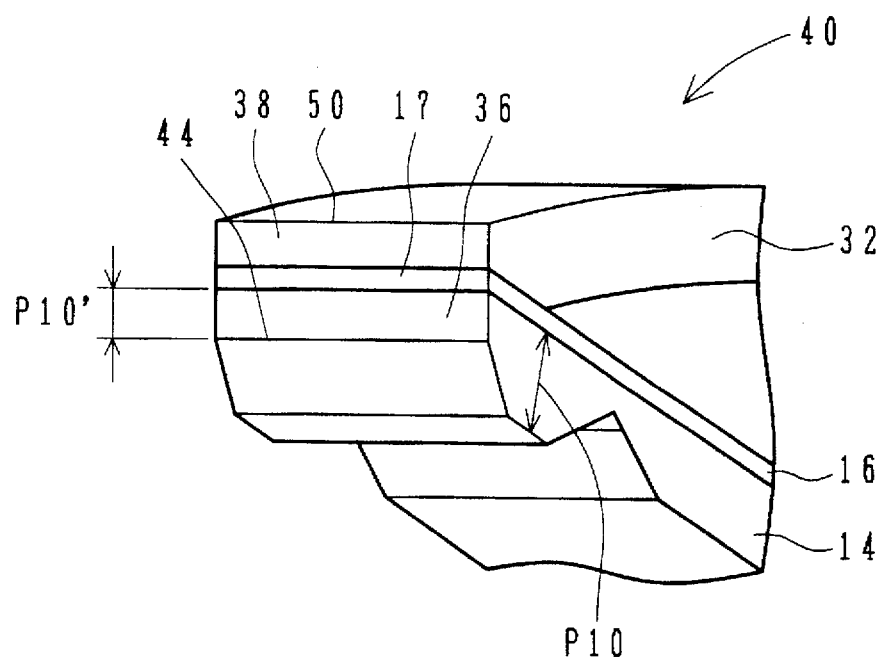
FIG. 16 is a perspective view of the pole front end portion of the thin film magnetic head shown in FIGS. 1A and 1B, as obliquely viewed from the lower portion.

FIG. 13A is a cross sectional side view of the thin film magnetic head, and FIG. 13B is a cross sectional front view as viewed from line A—A of FIG. 13A. After the magnetic gap layer 16, coil and insulating layer 48 are formed, the upper magnetic layer 32 inclusive of the upper pole 38 is formed. The passivation film 34 is formed last. The wafer is then cut and lapped to a level 60 corresponding to the predetermined throat height. At the end or the cut and lapping, the lower pole at the lower pole front end surface 36a has a predetermined thickness P10'. The upper and lower poles gradually increase their thickness from the pole front end surface toward the depth direction in the predetermined section. In the above manner, the thin film magnetic head 40 shown in FIGS. 1A and 1B is completed. The pole front end portion of the finished thin film magnetic head 40 as obliquely viewed from the lower portion is shown in FIG. 16.

With this manufacture method, in forming the lower pole 36, the protection layer 12 is selectively and vertically milled by ion etching or the like. Next, the slanted portion of the lower pole lower surface 36B is formed through ion etching of the whole surface. After the underlying metal film is formed over the whole surface of the lower pole, it is cut by using a resist pattern to determine the lower pole width. The lower pole is plated and lapped to Form a surface parallel to the substrate, the surface being the gap surface (lower pole upper surface 36A).

This manufacture method can form precisely the slanted portion matching the conditions of the thin film magnetic head of the embodiment, and a high yield is possible.

The thickness of the pole of this embodiment gradually increases from the pole front end surface in the depth direction in the predetermined section. Therefore, the end (edge in the track transport direction) of the pole is not definite n terms of magnetization as viewed from the recording medium. Accordingly, the dip depth of the undershoot in a reproduction signal reduces and the read error can be suppressed. The above structure is particularly efficient when it is applied to the lower pole having a large undershoot. The above structure becomes very efficient when it is applied to both the lower and upper poles.

The lower pole has a constriction 46 formed in the area further spaced apart from the pole front end surface, and then again increases its thickness. Since magnetic fluxes are constricted at this constriction during data write, magnetic saturation becomes hard to occur at the area near the pole front end surfaces. Therefore, the write magnetic field does not broaden in the track transport direction and becomes sharp so that the record density is increased. Reversed magnetized areas per unit motion distance can therefore be formed more on the recording medium to thereby improve the linear record density. In this case, the lower pole is formed to have generally the uniform thickness in the pole width direction at each position in the depth direction. Therefore, a magnetic domain of the lower pole become easily in parallel to the pole width direction because of magnetic anisotropy and magnetic fluxes move at high speed spin rotation. High permeability is therefore possible up to a high frequency band and the reproduction sensitivity can be improved in the high frequency band. The improved reproduction sensitivity permits using a thin film magnetic head with a narrow track width and the track density can be increased.

The present invention has been described in connection with the preferred embodiments. The invention is not limited only to the above embodiments. It is apparent to those skilled in the art that various modifications, improvements, combinations and the like can be made without departing from the scope of the appended claims.

We claim:

1. An induction type thin film magnetic head comprising:

an upper magnetic film for forming an upper pole with a first front end facing a magnetic recording medium. wherein a portion of the upper pole adjacent to the first front end has a first thickness along a track transport direction of the magnetic recording medium, the first thickness increasing gradually from the first end in a depth direction prependicular to the magnetic recording medium;

lower magnetic film for forming a lower pole with a second front end facing the magnetic recording medium, a portion of the lower pole adjacent to the second front end having a second thickness in a direction parallel to the first thickness, wherein the second thickness gradually increases from the second end in the depth direction in a first region, then reduces in a second region adjacent to the first region at a deeper area, and again gradually increases in a third region adjacent to the second region at a further deeper area; and a magnetic gap layer formed between the upper and lower poles for forming a magnetic gap between the upper and lower poles.

2. An induction type thin film magnetic head according to claim 1, wherein a pole width of the lower pole is generally constant in a section from the end of the lower pole toward the depth direction.

3. An induction type thin film magnetic head according to claim 2, wherein a pole width of the upper pole is generally constant in a section from the end of the upper pole toward the depth direction.

4. An induction type thin film magnetic head according to claim 1, wherein a pole width of the upper pole is generally constant in a section from the end of the upper pole toward the depth direction.

* * * * *

UNITED STATES PATENT AND TRADEMARK OFFICE
CERTIFICATE OF CORRECTION

PATENT NO. : 5,734,536
DATED : March 31, 1998
INVENTOR(S) : Shouji et al.

It is certified that error appears in the above-identified patent and that said Letters Patent is hereby corrected as shown below:

Column 10, claim 1,
Line 22, change "prependicular" to -- perpendicular --

Signed and Sealed this

Nineteenth Day of March, 2002

Attest:

Attesting Officer

JAMES E. ROGAN
Director of the United States Patent and Trademark Office